Nov. 15, 1966  D. M. SATAVA  3,284,913
THREAD RING GAUGE WITH FLUSH PIN
Filed Feb. 24, 1964
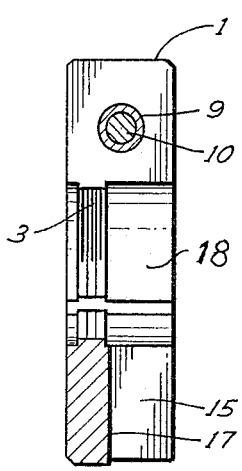
Fig. 2. Prior Art.
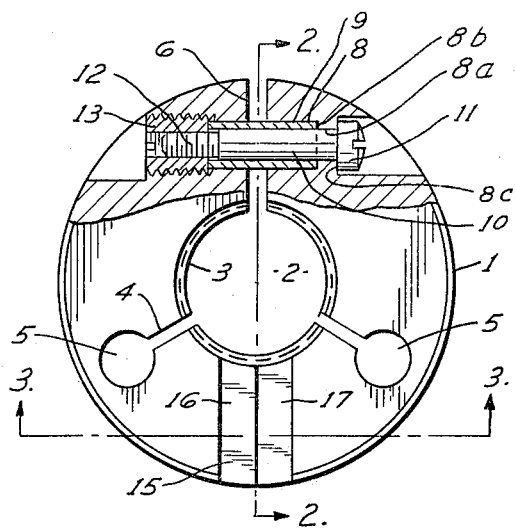
Fig. 1. Prior Art.
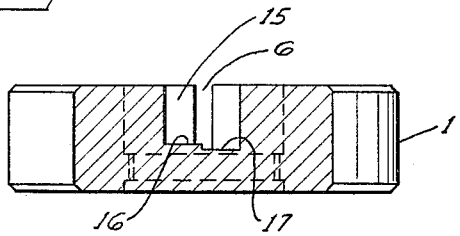
Prior Art Fig. 3.
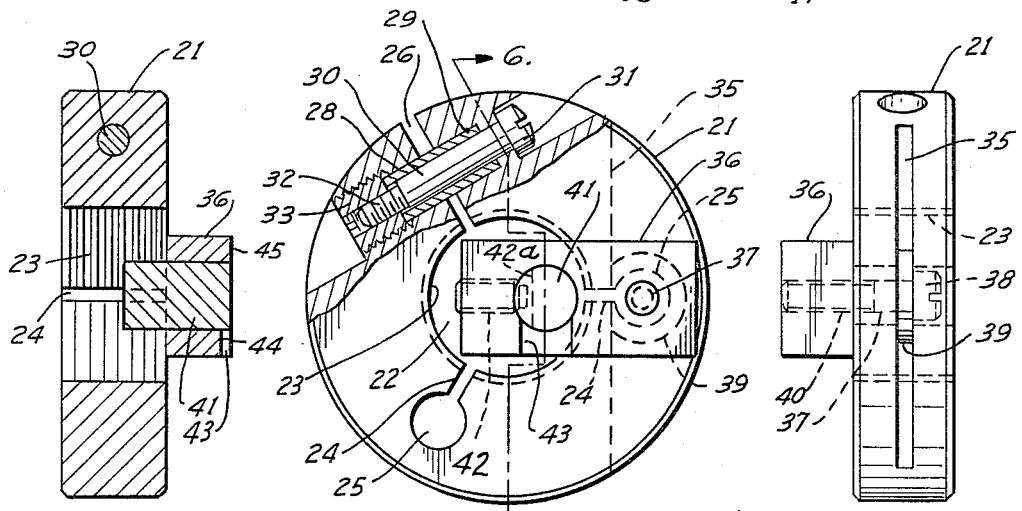
Fig. 6.   Fig. 4.   Fig. 5.
INVENTOR.
Donald M. Satava,
BY
John H. Leonard,
his ATTORNEY.

United States Patent Office 3,284,913
Patented Nov. 15, 1966

3,284,913
THREAD RING GAUGE WITH FLUSH PIN
Donald M. Satava, Wickliffe, Ohio, assignor to The Pipe Machinery Company, Wickliffe, Ohio, a corporation of Ohio
Filed Feb. 24, 1964, Ser. No. 346,849
6 Claims. (Cl. 33—199)

This invention relates to a thread ring gauge and particularly to a thread ring gauge of a conventional type combined with a flush pin, detachably connectible to opposite ends of the ring gauge so that the flush pin and gauge can be used to gauge particles from either end of the gauge, selectively.

The principal object of the present invention is to provide a ring gauge and flush pin combination whereby the standard ring gauge, as conventionally carried in stock in hardened finished condition, can be readily combined with a flush pin for gauging from either end of the gauge, selectively.

Various other objects and advantages will become apparent from the following description wherein reference is made to the drawings, in which:

FIGURE 1 is a top plan view of a conventional finished and hardened thread ring gauge of the prior art;

FIGS. 2 and 3 are sectional views of the gauge illustrated in FIG. 1, taken on lines 2—2 and 3—3, respectively, of FIG. 1;

FIG. 4 is a top plan view of a conventional gauge of the general type illustrated in FIG. 1, showing it in a combination with a flush pin so as to embody the present invention;

FIG. 5 is a right end elevation of the gauge and pin combination illustrated in FIG. 4; and FIG. 6 is a sectional view of the gauge illustrated in FIG. 4, as taken on line 6—6 thereof.

In order to appreciate the advantages of the present gauge, a conventional finished and hardened ring thread gauge of the prior art will be described. Referring to FIGURES 1, 2 and 3, such a gauge comprises an annulus or ring 1 of hardened tool steel having a central threaded bore 2 and gauging threads 3 therein. The ring has the usual planar parallel end surfaces normal to the axis of the bore 2. The gauge generally is made of hardened tool steel and, after completion, is very difficult to rework.

However, such gauges, both for facilitating their original production and for later compensating for wear are made adjustable. For this purpose, during manufacture, they are provided with a pair of radial slots 4 which intersect the bore 2 at their inner ends and terminate at their outer ends in bores 5. The slots 4 and bores 5 extend entirely through the gauge in a direction axially of the gauge. An additional slot 6 is provided. The slots 4 and 6 are generally arranged so that the three slots are 120° apart.

For adjusting the gauge, a transverse bore 8, spaced radially outwardly from the bore 2 and with its axis in a plane normal to the axis of the bore 2 and midway between the ends of the gauge is provided. Near to, but spaced from one of its ends, the bore 8 has a reduced diameter portion 8a, forming at its inner end a radial shoulder 8b and at its outer end a shoulder 8c. In the bore 8 is a sleeve 9 which at one end abuts the shoulder 8b. The bore 8 accommodates a bolt 10 having a head 11 which is disposed outwardly from, and arranged to bear against, the shoulder 8c. The bolt 10 has a reduced diameter threaded shank portion 12, which extends beyond the end of the sleeve 9 opposite from the shoulder 8b and is receivable in threaded engagement in an internally and externally threaded adjusting screw 13. The inner end of the adjusting screw 13 engages the adjacent end of the sleeve 9. By manipulation of the screw 13 and the bolt 10, the gauge can be contracted or expanded in a direction for closing and opening the notch, respectively, and locked in the contracted or expanded condition, thus conforming the diameter of the thread 3 precisely to that of a proper master gauge plug. This structure affords adjustment in original manufacture and also for subsequent wear. Gauges of this type, as originally provided, have an advantage in that they can receive a threaded article from either end. However, in many instances it happens that the length of the threaded portion of an article to be gauged does not extend entirely through the gauge axially. Instead, often the maximum length of thread to be gauged is less than the axial thickness of the gauge.

For this purpose, such gauges have been modified as illustrated in FIGURES 1 through 3, by providing in one end a radial channel 15 disposed diametrically opposite the slot 6. The channel 15 has stepped bottom wall surfaces 16 and 17, each of which is in a plane normal to the passage 2. Both of these surfaces are spaced from the ends of the ring and from each other axially of the gauge, in accordance with the minimum and maximum limitation of the length of the threaded portion of the article to be gauged. For example, the maximum length of thread of a threaded article should not reach beyond the surface 16, and the minimum length should reach at least to the surface 17. With such an arrangement, however, only the portion of the thread 3 from the entry end of the gauge up to the surface of the wall 16 is retained, and the remainder of the gauging thread is ground away, as shown at 18, from the wall 16 to the other end of the gauge. The grinding out of this portion of the thread is desirable for adjustment. For example, if this were not done, then after some wear of the used portion of the gauging thread, adjustment to compensate for the wear could not be made with the master gauge plug, because the unworn portion of the thread would bind on the plug before the worn portion was brought into conformance with the plug. Furthermore, the unused portion of the thread would tend to accumulate foreign matter.

In such a case, the surfaces 16 and 17 are suitable for gauging only from one end of the gauge, which is the bottom end in FIGURE 3. Necessarily, if the surfaces 16 and 17 are near the bottom of the gauge, the length of thread 3 is very limited and hence it is not as effective in maintaining coaxial relation with the article being gauged or with the master plug gauge. Furthermore, the stress imposed by the bolt 10 is midway between the ends of the gauge. The removal of the remainder of the thread 3 and the removal of metal in forming the channel 15 weaken the gauge along one portion of its axial length relative to the other portion. Therefore, the gauge has different resistance to contraction and expansion at portions which are offset axially of the gauge from the zone of application of the force by the bolt 10. This unbalance has a tendency to cause the gauge to open or close to a greater extent at the unthreaded portion than at the threaded portion under the force applied to the bolt 10. This unevenly distorts the gauge, leading to inaccuracies and imparting to the bore 2 a slightly frusto-conical shape. Hence the tightness of the gauge on the threaded portion of an article, as the threaded end of the article progresses into the bore 2 may vary throughout the length of the gauge thread.

For accurate reading, the threads should be balanced axially of the gauge relative to the plane through the axis of the bolt 10 and normal to the axis of the bore 2, and the gauge should have equal resistance to expansion and contraction in all planes through the gauge normal to its axis.

The gauge above described had one advantage, in that the channel 15 could be ground in the finished hardened gauge already in stock and the axis threads could be ground out of such a finished gauge. Thus the prior art conventional gauge, modified as illustrated in FIGURES 1 through 3, provided one solution of the problem. However, the disadvantages mentioned above still remain.

In accordance with the present invention as illustrated in FIGURES 4 through 6, a conventional finished and hardened ring gauge 21, the same basically as the gauge heretofore described except for the omission of the channel 15 and removal of excess thread, is provided. The gauge 21 has a central bore 22 with a gauging thread 23 therein. Radial slots 24 extend from the central bore outwardly into bores 25, respectively. These slots and associated bores correspond to the slots 4 and bores 5 of the structure illustrated in FIGURE 1, and extend entirely through the ring endwise of the ring. The gauge also has a radial slot, 26, corresponding to the slot 6, and a transverse bore 28 in which is a sleeve 29. An adjusting bolt 30, having a head 31 and a reduced end portion 32 cooperable with an internally and externally threaded adjusting screw 33 are provided for adjusting the gauge, which is the standard finished and hardened gauge described in FIGURE 1, but without the channel 15.

In order to provide flush pins for cooperation with the ring gauge, a slot 35, disposed in a plane normal to the axis of the bore 22 and midway between the ends of the ring 21, is ground in the ring. The base of this slot is preferably chordal and is disposed inwardly beyond one of the bores 25, preferably normal to the radius from the axis of the central bore 22 through the axis of the bore 25. A supporting body 36 for a flush pin is provided, and is adapted to lie in smooth face to face juxtaposition with either planar end of the ring 21, selectively. The body 36 has a portion which overhangs the central bore 22. The body is secured in position by means of a bolt 37 which is of less diameter than, and has a head 38 which fits with slight operating clearance and coaxial relation in, the one of the bores 25 which is adjacent the slot 35. The bolt 37 is inserted into the bore 25 from one end of the ring and a suitable spacing washer 39 is disposed in the slot 35 in position to permit passage of the shank of the bolt 37 therethrough. The thickness of the washer is substantially equal to the width of the slot 35. One edge of the washer 39 is ground accordingly to fit snugly against the base wall of the slot 35.

The shank of the screw indicated at 40, extends entirely through the ring to the other end of the ring. The shank is threaded and is installed in threaded engagement with an internally threaded bore in the body 36, thus drawing the body firmly against the associated end surface of the gauge.

A flush pin 41 is mounted in the overhanging portion of the body 36 for reciprocation in a direction parallel of the axis of the bore 22 in a suitable bore in the body 36. The pin has a notch 42a in which the inner end of a set screw 42 is disposed so as to retain the flush pin in its bore while permitting movement of the flush pin 41 endwise to the extent required for gauging. The flush pin 41 can be of such length as is desired, depending upon the pieces to be gauged, but generally it will be such as to extend into the bore 22 so that when its outer end is flush with the outer surface of the body 36 it will indicate that the piece to be gauged is threaded for the proper length. If desired, different length pins can be provided, dependent upon the pieces on which the gauge is to be used. However, in many cases it is desirable to provide a suitable notch, as indicated at 43, in the upper face of the body 36, having a minimum gauging surface 44 and a flush surface 45 on the body 36, so that the maximum thread length is indicated when the outer end of the pin 41 is flush with the outer surface 45 of the body 36 and the minimum length is indicated when the outer end of the pin is flush with the surface 44.

In this structure, the threads of the original gauge continue entirely through the standard gauge. Hence, the problem of inbalance of adjusting stresses and the like do not exist. The threads extend equidistantly on both sides of the plane through the axis of the bolt 31 and normal to the axis of the bore 22.

After a gauge has been used from one end for a period of time, the body 36 may be readily removed and installed on the other end of the gauge, and the first end on which the body was originally installed may be used as the entry end for gauging. Thus equal wear can be obtained from both ends and proper adjustment can be made. The great advantage of the present gauge is that the standard gauge may be taken out of stock after it has been finished and hardened, and by the slight change of providing the slot 35 in the gauge, the gauge can be provided with a flush pin which permits the gauge to be so used that equal wear can be secured at both ends, thus greatly increasing the useful life of the gauge.

The slot 35 is preferably a long chordal slot which can be ground in the hardened metal. The long chordal slot is preferred because it can be ground without creating a great amount of heat by repeated straight passes of a grinder chordally of the ring 21, with negligible heating at each pass, and ample cooling between passes so as not to subject the ring to thermal shocks. It is apparent that the present invention greatly reduces the stock of gauges which must be kept on hand at the manufacturing site, and permits a wide range of selection in the combination of maximum and minimum lengths that can be tested by reference to the flush pin. If different limits are required, different lengths of flush pins may be temporarily installed, as required in each instance.

Having thus described my invention, I claim:

1. A thread ring gauge comprising an annular body having a central internally threaded gauging bore extending endwise through the body, slots extending through the body endwise and from the bore outwardly, at least one of the slots terminating at its outer end in a bore extending endwise through the body and offset from the central bore, another of the slots extending through the outer periphery of the body, adjusting means in the body and operable to expand and contract the body by stressing the body in directions transversely of the length of said other slot, a rigid supporting member, connecting means detachably connecting the member in fixed position relation to the body against opposite ends of the body, selectively, with a portion of the member overhanging that end of the central bore which is at that end of the body at which the member is disposed, and a flush pin mounted in said portion for movement endwise of its axis and of the central bore and having a portion extending axially into said bore at the end of said bore at which the member is disposed.

2. The apparatus of claim 1 wherein the member is connected to the body by a bolt disposed in said offset bore and having an end portion projecting beyond said end of the body at which the member is disposed and secured to said member.

3. The apparatus of claim 2 wherein a nonradial slot is provided in the body in a plane normal to the axis of the central bore and intersects said offset bore, a washer having a thickness substantially equal to the width of the nonradial slot is accommodated in the nonradial slot, and said bolt extends through the washer and clamps the member firmly into juxtaposition with the end of the body.

4. The apparatus of claim 3 wherein the body is cylindrical and the nonradial slot is chordal.

5. The apparatus of claim 3 wherein the head of the bolt has essentially the same diameter as the portion of the offset bore in which it is received, and the washer is of larger external diameter than said offset bore.

6. The apparatus of claim 3 wherein the end faces of the cylindrical body are flat and normal to the axis of the central bore, the offset bore is of uniform diameter throughout its length, and the member can be clamped by the bolt to the body at either end selectively, in face to face relation to said end faces, with the axis of the flush pin parallel to the axis of the central passage.

References Cited by the Examiner

UNITED STATES PATENTS

| 1,447,448 | 3/1923 | Walch | 33—199 |
| 2,466,185 | 4/1949 | Stoothoff | 33—169 |
| 2,559,771 | 7/1951 | Johnson | 33—199 |

LEONARD FORMAN, *Primary Examiner.*

HARRY N. HAROIAN, *Assistant Examiner.*